(12) United States Patent
Shah et al.

(10) Patent No.: US 11,323,547 B2
(45) Date of Patent: May 3, 2022

(54) CLOUD DRIVEN APPLICATION LAUNCHER FOR EXECUTION AND CONTROL OF APPLICATIONS IN COMPUTING DEVICES

(71) Applicant: Tata Consultancy Services Limited, Mumbai (IN)

(72) Inventors: Viral Prakash Shah, Thane West (IN); Shobhit Shukla, Thane West (IN); Sachin Ramdas Naik, Thane West (IN); Ankush Sharma, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 51 days.

(21) Appl. No.: 17/036,276

(22) Filed: Sep. 29, 2020

(65) Prior Publication Data
US 2021/0368024 A1    Nov. 25, 2021

(30) Foreign Application Priority Data
May 21, 2020    (IN) ............................. 202021021472

(51) Int. Cl.
| | |
|---|---|
| H04L 29/06 | (2006.01) |
| G06F 8/61 | (2018.01) |
| H04L 12/24 | (2006.01) |
| H04L 29/08 | (2006.01) |
| H04L 67/01 | (2022.01) |
| H04L 41/0859 | (2022.01) |
| H04L 67/1095 | (2022.01) |
| H04L 67/00 | (2022.01) |

(52) U.S. Cl.
CPC ................ *H04L 67/42* (2013.01); *G06F 8/61* (2013.01); *H04L 41/0859* (2013.01); *H04L 67/1095* (2013.01); *H04L 67/34* (2013.01)

(58) Field of Classification Search
CPC . H04L 67/42; H04L 41/0859; H04L 67/1095; H04L 67/34; G06F 8/61
See application file for complete search history.

(56) References Cited

U.S. PATENT DOCUMENTS

| | | |
|---|---|---|
| 6,765,596 B2 | 7/2004 | Lection et al. |
| 9,135,025 B2 | 9/2015 | Ellison |

(Continued)

*Primary Examiner* — Christopher B Robinson
(74) *Attorney, Agent, or Firm* — Finnegan, Henderson, Farabow, Garrett & Dunner LLP

(57) ABSTRACT

Conventionally, application launchers have limited their functionality to provide shortcut ways for searching/executing pre-configured applications and fail to provide a uniform user experience and usability across computing systems and applications installed therein. Currently, applications in such computing systems are manual controlled, which is time consuming and thus lack in security during accessing content. Present disclosure provides a cloud driven application launcher (CDAL) that is installed in client device. Once the computing device is configured with latest configurations, the client device serves as a master device wherein the master device creates, in an offline mode, an ad hoc network wherein other client devices connect to master device for upgrading version of applications comprised in client devices to a corresponding version of applications in master device. The master device and client devices are synchronized by the CDAL and a uniform user interface (UI) is enabled for the master device and client devices.

18 Claims, 4 Drawing Sheets

(56) References Cited

U.S. PATENT DOCUMENTS

| | | | |
|---|---|---|---|
| 2006/0010096 A1* | 1/2006 | Crossland | G06F 16/9577 |
| 2015/0358428 A1* | 12/2015 | Kobayashi | H04L 67/145 |
| | | | 709/203 |
| 2018/0255591 A1* | 9/2018 | Valicherla | H04L 63/0272 |

* cited by examiner

CLOUD DRIVEN APPLICATION LAUNCHER FOR EXECUTION AND CONTROL OF APPLICATIONS IN COMPUTING DEVICES

PRIORITY CLAIM

This U.S. patent application claims priority under 35 U.S.C. § 119 to: India Application No. 202021021472, filed on May 21, 2020. The entire contents of the aforementioned application are incorporated herein by reference.

TECHNICAL FIELD

The disclosure herein generally relates to application launchers, and, more particularly, to cloud driven application launchers for execution and control of applications in computing devices.

BACKGROUND

An application launcher (AL) is an executable application program, typically, an integral part of any operating system, and primarily serves as a start menu option in operating systems configured in computing systems. Conventionally, AL has limited its functionality to provide shortcut ways for searching one or more pre-configured applications, wherein when an input is received on an icon of a specific application, the application is launched. However, such launchers fail to provide a uniform user experience and usability across computing systems (e.g., computer systems, laptops, tablets, etc.) and applications installed therein. This may be due to versions of the operating systems configured in a computer system therein. For example, in the art, managing the pre-configured applications is independent of the application launcher, which includes accessing content, updating of specific applications, uninstallation, and the like, which tend to be time consuming. More specifically, for any change in the applications, typically one must manually navigate to control panel settings either within the same application or from settings of the operating system and select appropriate options.

Many organizations and/or institutions operate businesses or day-to-day activities on computing systems having custom operating systems with personalized application launchers. However, even in such arrangements, controlling of these different pre-configured applications requires manual intervention to a large extent and these consume intensive resources of the computing system. For instance, a user such as an information security (IS) manager/associate or an authorized user has to manually scrutinize such systems, either locally or by taking the control remotely and take required measures (e.g., determining (i) whether a new application has to be installed, (ii) whether an existing application which could be either an under-utilized application or an outdated version needs an update, and (iii) whether any application needs to be uninstalled).

With the advancement in technology, there is tremendous increase in data and personalized services which are being made available on end user's device. Service providers have made attempts to provide optimized performance, and quality of service (QoS) with enhanced security. However, there is a tradeoff between performance, QoS and user experience, and usability and these have varied over time and are not consistent due to inherent nature of the devices, operating systems and applications installed therein. Therefore, it is important to provide seamless experience to users for accessing content from such services/data with security as an enabled feature. In other words, services and data should be provided through applications on a need to know basis and transmitted over a secured communication channel for seamless user experience across devices.

SUMMARY

Embodiments of the present disclosure present technological improvements as solutions to one or more of the above-mentioned technical problems recognized by the inventors in conventional systems. For example, in one aspect, there is provided a method for execution and controlling applications in computing devices. The method comprises creating, in an offline mode, an ad hoc network by a cloud driven application launcher (CDAL), the CDAL being configured on a client device serving as a master device at a given time of instance; establishing, by the CDAL, a communication session between the master device and a plurality of client devices using the created ad hoc network, wherein the master device and the plurality of client devices are associated with an entity; upgrading in the offline mode, by the CDAL, a version of one or more applications comprised in the plurality of client devices to a corresponding version of one or more corresponding applications comprised in the master device; and synchronizing in the offline mode, via the ad hoc network, the master device and the plurality of client devices such that a uniform user interface (UI) is enabled for the master device and the plurality of client devices.

In an embodiment, the step of creating, in an offline mode, an ad hoc network by a cloud driven application launcher (CDAL) is preceded by: transmitting, by the client device, a request to a cloud server, wherein the at least one device is one of the client device serving as the master device or the plurality of client devices; and obtaining, from the cloud server, information pertaining to the entity to which the client device is tagged, based on the request, wherein the information pertaining to the entity is stored in a database of the client device.

In an embodiment, when the cloud server fails to recognize the client device, the cloud server aborts communication with, and transmission of subsequent information to, the client device.

In an embodiment, the step of creating, in an offline mode, an ad hoc network by a cloud driven application launcher (CDAL) is preceded by: transmitting, by the CDAL of the client device, (i) information pertaining to the entity to which the client device is tagged and (ii) a device identifier of the client device to a cloud server, wherein the information and the device identifier are transmitted by the CDAL when a launch instance of the CDAL is determined as a first time launch instance; obtaining, by the CDAL of the client device, a configuration record version from the cloud server; performing, by the CDAL of the client device, a comparison of the obtained configuration record version and a configuration record version comprised in the client device; and obtaining, by the CDAL of the client device, updated configuration records along with one or more configuration elements and a version of configuration check based on the comparison; and reconfiguring the CDAL and one or more associated attributes by (i) parsing the updated configuration records along with the one or more configuration elements and (ii) applying one or more associated changes to the CDAL of the client device.

In an embodiment, the method further comprises upon reconfiguring the CDAL, creating, by the CDAL of the client device, one or more icons for one or more applications configured in the client device.

In an embodiment, the method further comprises transmitting, by the CDAL, a device identifier of the client device; and obtaining, from the cloud server, details comprising (i) a list of applications configured for the entity, (ii) a version of each application in the list of applications, and (iii) a uniform resource locator of each application in the list of applications.

In an embodiment, the method further comprises determining based the list of applications, by the CDAL of the client device, a state and a version of one or more specific applications comprised in the client device, wherein the state comprises a presence or an absence of the one or more specific applications, and wherein the one or more specific applications are from the list of applications; and based on the determined state and the determined version of the one or more specific applications comprised in the client device, performing, by the CDAL, one of: (i) registering, in the database of the client device, (a) the determined version of the one or more specific applications is an outdated version and (b) the one or more specific applications are required for an upgrade; (ii) registering, in the database of the client device, the one or more specific applications are (a) not configured in the client device and (b) required for download and installation therein; and (iii) uninstalling the one or more specific applications from the client device and removing an associated entry from the database.

In an embodiment, based on the determined state, the CDAL is configured to (i) install the one or more specific applications in the master device based on an availability and (ii) register a status of each of the one or more specific applications in the database.

In an embodiment, the status is one of an installation successful or an installation unsuccessful, and wherein the CDAL is configured to (i) provide the uniform UI and (ii) enable a device management from the cloud server based on the determined state and the status.

In an embodiment, each of the CDAL of the master device and the plurality of corresponding CDALs of the plurality of client devices comprises a UI based power element.

In an embodiment, the method further comprises preventing a change from a first state to a second state in one or more of the master device and the plurality of client devices, upon receipt of an input on the UI based power element, during an execution of at least one application comprised therein.

In an embodiment, the first state is an active ON state, and the second state is selected from the group of modes consisting of a sleep mode, a hibernation mode, and a shutdown mode.

In an embodiment, the method further comprises dynamically configuring and assigning, by the CDAL of the master device, a unique theme to each of the plurality of client devices.

In an embodiment, the method further comprises determining, by the CDAL associated with the master device, content to be shared with one or more of the plurality of client devices; and rendering based on the determined content, by the CDAL, the unique theme on the one or more of the plurality of client devices.

In another aspect, there is provided a client device for execution and controlling applications in computing devices. The client device comprises: a memory storing instructions, a database and a cloud driven application launch (CDAL); one or more communication interfaces; and one or more hardware processors coupled to the memory via the one or more communication interfaces, wherein the one or more hardware processors are configured by the instructions to execute the CDAL, the CDAL, upon execution is configured to: create, in an offline mode, an ad hoc network, the CDAL being configured on a client device serving as a master device at a given time of instance; establish a communication session between the master device and a plurality of client devices using the created ad hoc network, wherein the master device and the plurality of client devices are associated with an entity; upgrade in the offline mode, by the CDAL, a version of one or more applications comprised in the plurality of client devices to a corresponding version of one or more corresponding applications comprised in the master device; and synchronize in the offline mode, via the ad hoc network, the master device and the plurality of client devices such that a uniform user interface (UI) is enabled for the master device and the plurality of client devices.

In an embodiment, prior to creating an ad hoc network, the CDAL of the client device is configured to transmit a request to a cloud server, and obtain, from the cloud server, information pertaining to an entity to which the client device is tagged, based on the request. In an embodiment, the information pertaining to the entity is stored in the database of the client device.

In an embodiment, when the cloud server fails to recognize the at least one client device, the cloud server aborts communication with, and transmission of subsequent information to, the client device.

In an embodiment, prior to creating, by the cloud driven application launcher, the ad hoc network, the CDAL of the client device is configured to transmit (i) information pertaining to an entity to which the client device is tagged to and (ii) a device identifier of the client device to a cloud server, the information and the device identifier are transmitted by the CDAL when a launch instance of the CDAL is determined as a first time launch instance; obtain a configuration record version from the cloud server; perform a comparison of the obtained configuration record version and a configuration record version comprised in the client device; and obtain updated configuration records along with one or more configuration elements and a version of configuration check based on the comparison; and reconfigure the CDAL and one or more associated attributes by (i) parsing the updated configuration records along with the one or more configuration elements and (ii) applying one or more associated changes to the CDAL of the client device.

In an embodiment, upon reconfiguring the CDAL, the reconfigured CDAL creates one or more icons for one or more applications configured in the client device.

In an embodiment, the CDAL of the master device is configured to transmit a device identifier of the client device; and obtain, from the cloud server, details comprising (i) a list of applications configured for the entity, (ii) a version of each application in the list of applications, and (iii) a uniform resource locator of each application in the list of applications.

In an embodiment, the CDAL of the master device is configured to determine, based the list of applications, a state and a version of one or more specific applications comprised in the client device, the state comprises a presence or an absence of the one or more specific applications, the one or more specific applications are from the list of applications; and perform, one of the following based on the determined state and the determined version of the one or more specific applications comprised in the client device: (i) registering, in the database of the client device, (a) the determined version of the one or more specific applications is an outdated version and (b) the one or more specific applications are required for an upgrade; (ii) registering, in the database of the client device, the one or more specific applications are (a) not configured in the client device and (b) required for download and installation therein; and (iii) uninstalling the one or more specific applications from the client device and removing an associated entry from the database.

In an embodiment, based on the determined state, the CDAL of the master device is configured to (i) install the one or more specific applications in the master device based on an availability and (ii) register a status of each of the one or more specific applications in the database.

In an embodiment, the status is one of an installation successful or an installation unsuccessful, and wherein the CDAL is configured to (i) provide the uniform UI and (ii) enable a device management from the cloud server based on the determined state and the status.

In an embodiment, each of the CDAL of the master device and the plurality of corresponding CDALs of the plurality of client devices comprises a UI based power element.

In an embodiment, the CDAL of the master device is configured to preventing a change from a first state to a second state in one or more of the master device and the plurality of client devices, upon receipt of an input on the UI based power element, during an execution of at least one application comprised therein.

In an embodiment, the first state is an active ON state, and the second state is selected from the group of modes consisting of a sleep mode, a hibernation mode, and a shutdown mode.

In an embodiment, the CDAL of the master device is configured to dynamically configure and assign a unique theme to each of the plurality of client devices.

In an embodiment, the CDAL of the master device is configured to determine content to be shared with one or more of the plurality of client devices; and render based on the determined content, by the CDAL, the unique theme on the one or more of the plurality of client devices.

A computer program product comprising a non-transitory computer readable medium having a computer readable program embodied therein, wherein the computer readable program, when executed on a computing device serving as a master device, causes the computing device to execute a cloud driven application launch comprised in the computing device, for controlling applications in other computing devices serving as client devices, by: creating, in an offline mode, an ad hoc network, by the cloud driven application launcher (CDAL), the CDAL being configured on a client device serving as the master device at a given time of instance; establishing, by the CDAL, a communication session between the master device and a plurality of client devices using the created ad hoc network, wherein the master device and the plurality of client devices are associated with an entity; upgrading in the offline mode, by the CDAL, a version of one or more applications comprised in the plurality of client devices to a corresponding version of one or more corresponding applications comprised in the master device; and synchronizing in the offline mode, via the ad hoc network, the master device and the plurality of client devices such that a uniform user interface (UI) is enabled for the master device and the plurality of client devices.

In an embodiment, the step of creating, in an offline mode, an ad hoc network, by the cloud driven application launcher (CDAL) is preceded by: transmitting, by the client device, a request to a cloud server, wherein the client device is one of the client device serving as the master device or the plurality of client devices; and obtaining, from the cloud server, information pertaining to the entity to which the client device is tagged to, based on the request, wherein the information pertaining to the entity is stored in a database of the client device.

In an embodiment, when the cloud server fails to recognize the client device, the cloud server aborts communication with, and transmission of subsequent information to, the client device.

In an embodiment, the step of creating, in an offline mode, an ad hoc network, by the cloud driven application launcher (CDAL) is preceded by: transmitting, by the CDAL of the client device, (i) information pertaining to the entity to which the client device is tagged and (ii) a device identifier of the client device to a cloud server, wherein the information and the device identifier are transmitted by the CDAL when a launch instance of the CDAL is determined as a first time launch instance; obtaining, by the CDAL of the client device, a configuration record version from the cloud server; performing, by the CDAL of the client device, a comparison of the obtained configuration record version and a configuration record version comprised in the client device; and obtaining, by the CDAL of the client device, updated configuration records along with one or more configuration elements and a version of configuration check based on the comparison; and reconfiguring the CDAL and one or more associated attributes by (i) parsing the updated configuration records along with the one or more configuration elements and (ii) applying one or more associated changes to the CDAL of the client device.

In an embodiment, upon reconfiguring the CDAL, the CDAL of the master device creates one or more icons for one or more applications configured in the client device.

In an embodiment, the CDAL of the master device transmits a device identifier of the client device; and obtains, from the cloud server, details comprising (i) a list of applications configured for the entity, (ii) a version of each application in the list of applications, and (iii) a uniform resource locator of each application in the list of applications.

In an embodiment, the CDAL of the master device further determines based the list of applications, by the CDAL of the client device, a state and a version of one or more specific applications comprised in the client device, wherein the state comprises a presence or an absence of the one or more specific applications and wherein the one or more specific applications are from the list of applications; and based on the determined state and the determined version of the one or more specific applications comprised in the client device, performing, by the CDAL, one of: (i) registering, in the database of the client device, (a) the determined version of the one or more specific applications is an outdated version and (b) the one or more specific applications are required for an upgrade; (ii) registering, in the database of the client device, the one or more specific applications are (a) not configured in the client device and (b) required for download and installation therein; and (iii) uninstalling the one or more specific applications from the client device and removing an associated entry from the database.

In an embodiment, based on the determined state, the CDAL is configured to (i) install the one or more specific applications in the master device based on an availability and (ii) register a status of each of the one or more specific applications in the database.

In an embodiment, the status is one of an installation successful or an installation unsuccessful, and wherein the CDAL is configured to (i) provide the uniform UI and (ii)

enable a device management from the cloud server based on the determined state and the status.

In an embodiment, each of the CDAL of the master device and the plurality of corresponding CDALs of the plurality of client devices comprises a UI based power element.

In an embodiment, the CDAL of the master device prevents a change from a first state to a second state in one or more of the master device and the plurality of client devices, upon receipt of an input on the UI based power element, during an execution of at least one application comprised therein.

In an embodiment, the first state is an active ON state, and the second state is selected from the group of modes consisting of a sleep mode, a hibernation mode, and a shutdown mode.

In an embodiment, the CDAL of the master device dynamically configures and assigns a unique theme to each of the plurality of client devices.

In an embodiment, the CDAL of the master device determines content to be shared with one or more of the plurality of client devices; and renders, based on the determined content, the unique theme on the one or more of the plurality of client devices.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
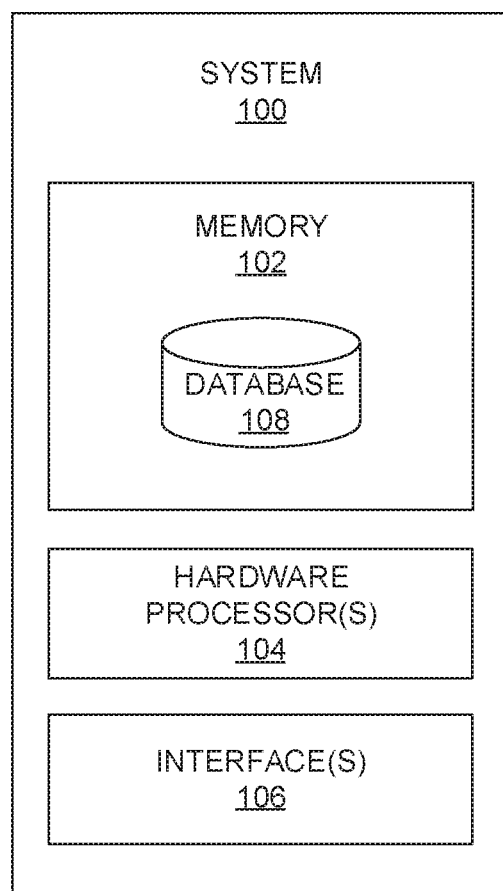
FIG. 1 depicts a system for execution and controlling applications in computing devices, in accordance with an embodiment of the present disclosure.
Figure 2A:
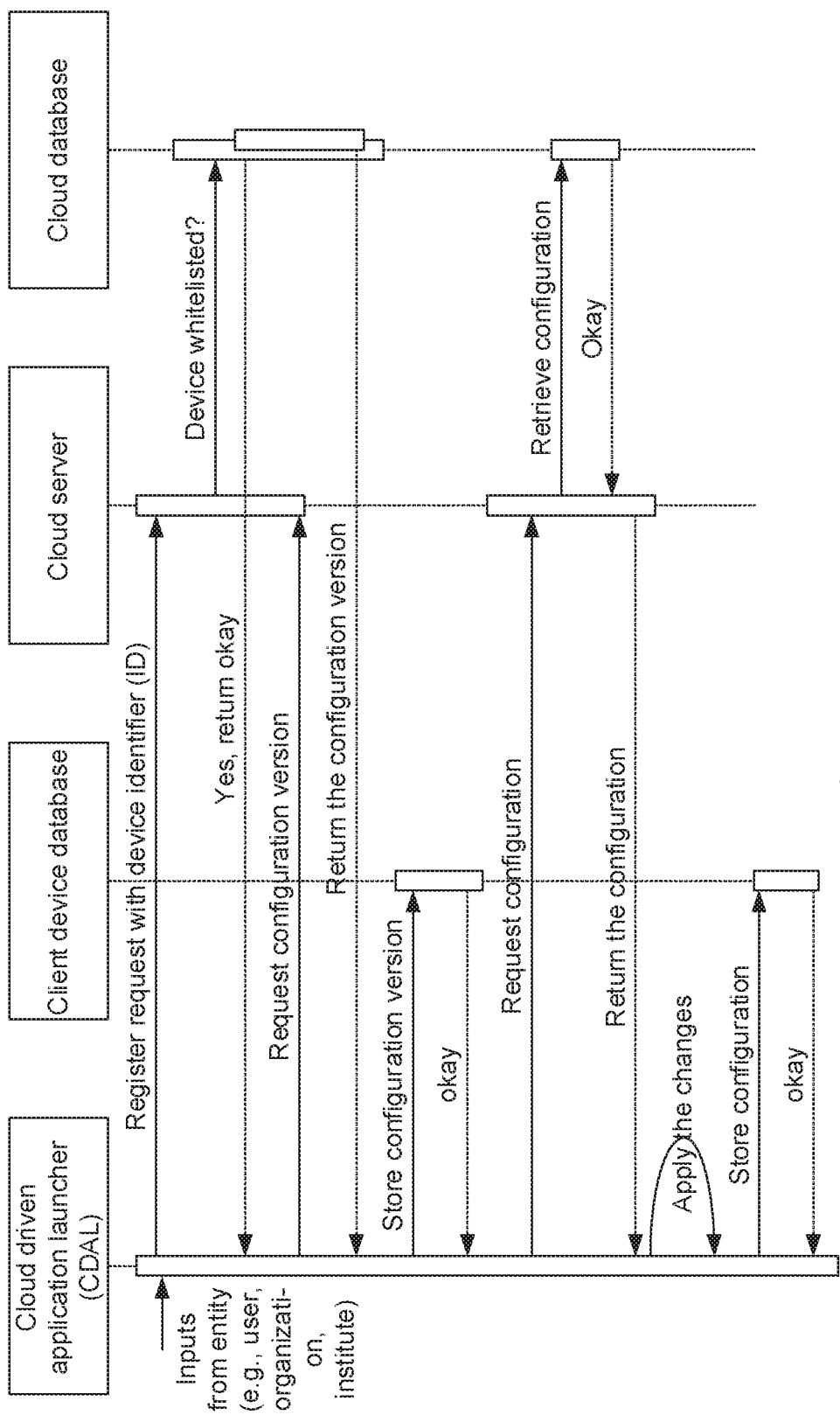
FIG. 2A depicts a sequence diagram illustrating a method for configuring one or more applications by a cloud driven application launcher comprised in at least one client device, during a communication session being established between the at least one client device and a cloud server, in accordance with an embodiment of the present disclosure.
Figure 2B:
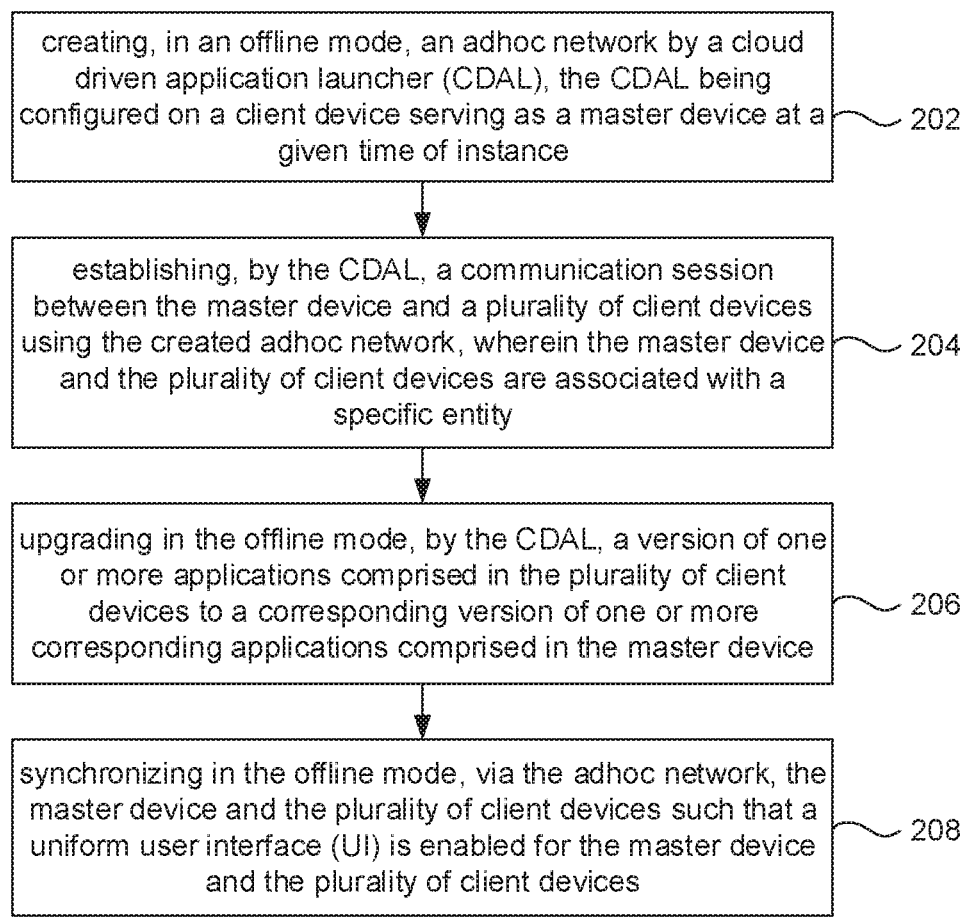
FIG. 2B depicts an exemplary flow chart illustrating a method for upgrading and synchronizing applications in a plurality of client devices, by the at least one client device serving as a master device in accordance with an embodiment of the present disclosure.
Figure 3:
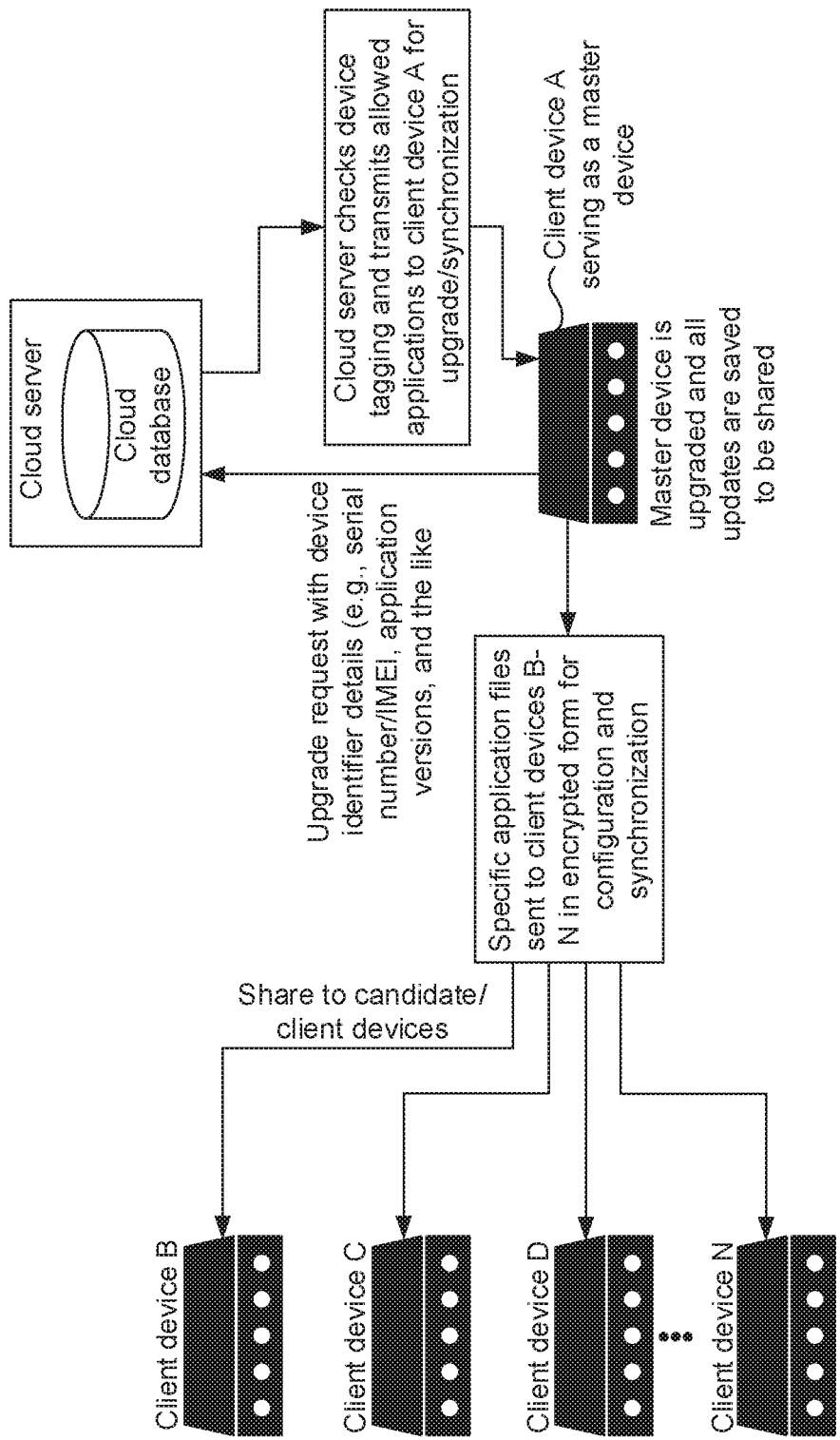
FIG. 3 depicts a block diagram of an overall architecture for execution and controlling of applications installed in a plurality of client devices, by the cloud server via the master device, in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 depicts a system 100 for execution and controlling applications in computing devices, in accordance with an embodiment of the present disclosure. In an embodiment, the system 100 is referred as a 'client device', or a 'master device' and may be interchangeably used herein. The client device/master device 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., mobile communication device such as smart phones, tablet/tablet computer), workstations, mainframe computers, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the 1/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information pertaining to each application, its version, current state and other configurations and attributes pertaining to the applications and their management. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2A, with reference to FIG. 1, depicts a sequence diagram illustrating a method for configuring one or more applications by a cloud driven application launcher comprised in at least one client device, during a communication session being established between the at least one client device and a cloud server, in accordance with an embodiment of the present disclosure. Though FIG. 1B depicts a sequence diagram of a single client device interacting with the cloud server, it is to be understood by a person having ordinary skill in the art or person skilled in the art that there could be any number of client devices interacting with the cloud server at any given time instance. In other words, any of a plurality of client devices may establish a communication session with the cloud server at any given instance and can serve as the master device. For example, at time period 't', say a client device X amongst other client devices has connected with the cloud server and obtained applications and is upgraded to date. After 't+m' time period, there could be another client device Y amongst the client devices which has connected with the cloud server and obtained applications and is upgraded to date, wherein the upgradation included an additional upgrade that is not present with client device X. Therefore, in such scenarios, client device Y can act/serve as a master device. In time periods, 't' and 't+m', 't' can refer to say April 20, 12:00 noon and 't+m' can refer to say April 20, 12:10 PM. In other words, in next few minutes, it is likely that there could possibly be further updates and client device X may have missed such updates. Since client device Y had connected at 't+m' time period, any updates between time interval 't' and 't+m' may not be present in the client device X but would be available with client device Y wherein the client device Y gets updated to the latest configurations/applications. In such scenarios, client device X can still serve as the master device and can provide all updates that it has, however may not be able to provide the additional upgrade (App 'abc' version 2.5) to other client devices. Whereas client device Y can serve as a master device and can provide not only updates that the client device X was capable of providing but also that additional upgrade (App 'abc' version 2.5) which was made available to it during the 't+m' time period. Hence, both client devices X and Y can serve as the master device to provide updates/upgrades to other client devices via an ad hoc network created therein.

Say, a client device 'A' (e.g., the client device 100 and the expressions 'client device A, master device' and 'client device' may be interchangeably used herein depending upon context) comprises the cloud driven application launcher (CDAL). The expression 'cloud driven application launcher (CDAL)' refers to an executable application program launcher, wherein the CDAL forms an integral part of any operating system configured in computing systems (e.g., client devices). The cloud driven application launcher (CDAL) is configured from a central entity such as 'cloud server' for control and execution of applications comprised in client devices and enables client device management from the cloud server as described in the present disclosure. The client device A in this case could be the client device X or client device Y, in one example embodiment. The CDAL of the client device A transmits a request to the cloud server. The request comprises registration of a unique device identifier of the client device A with the cloud server. Upon transmission of the request, the cloud server may register the client device A and flag the client device A as a whitelisted device. Such transmission request and registration are carried out when a launch instance of the CDAL is determined as a first time launch instance. Examples of the unique device identifier may include, but are not limited to, serial number, an International Mobile Equipment Identity (IMEI) as known in the art, and the like. The cloud server comprises a cloud database that stores details of client devices that are blacklisted or whitelisted. Additionally, the cloud database stores information on version for a configuration of any client device, wherein a first change is tagged as version 1, any subsequent changes are tagged as version 2, and so on. Other information that is stored in the cloud database includes a unique device identifier associated with each of the plurality of client devices.

The cloud server verifies the request based on the details stored in the cloud database. In other words, if the details of the client device A are recognized by the cloud server, then the cloud server engages the client device A in further communications. When the cloud server fails to recognize the client device A, the cloud server aborts communication with, and transmission of any information to, the client device A. Alternatively, failure to recognizing the client device A, the cloud server may flag the client device A as a blacklisted device.

As depicted in FIG. 2A, if the client device A is successfully recognized by the cloud server, the CDAL of the client device A further transmits another request for obtaining a configuration record version from the cloud server. The CDAL then performs a comparison of the obtained configuration record version (from the cloud server) and a configuration record version comprised in the client device A. If the comparison results in a match, then the configuration record version comprised/configured in the client device A is identified as a latest/most recent configuration record version. If the CDAL determines that the configuration record version comprised in the client device A is an outdated version record, then the CDAL obtains updated configuration records along with one or more configuration elements and a version of configuration check from the cloud server. Below is an illustrative example of configuration record version:

```
{
    "Configuration Record": true"
    "Configuration Record Version": "1"
    "Application Record": {
    "Application Name": "ABC"
    "Application version": "1"
    <Other item information>
    ...
    "Application Name": "DEF"
    "Application version": "4"
    ...
    }
    "Behaviour Record": {
    "Behaviour name": "PQR"
    "Behaviour version": "1"
    ...
    }
    ...
}
```

The configuration record version as depicted above is updated at the cloud server based on any changes to configuration data at the cloud server. Therefore, the configuration record version is always saved by all the client devices. Whenever the client devices want to check if there is any change in the configuration record, the configuration record version present in the client device is compared with the configuration record received from the cloud server, to determine whether the version in the client device is an updated/latest version or an outdated version.

The CDAL then configures itself with the latest/most recent configuration record version as received from the cloud server along with one or more associated attributes. More specifically, the CDAL of the client device A parses the updated configuration records along with the one or more configuration elements and applies one or more associated changes to the CDAL of the client device A.

Upon reconfiguring itself, the CDAL of the client device A creates one or more icons for one or more applications configured in the client device A. Further, the CDAL of the client device A obtains, from the cloud server, details comprising (i) a list of applications configured for the entity (e.g., say a company ABC or an education institute XYZ wherein the client device A is tagged to this entity), (ii) a version of each application in the list of applications, and (iii) a uniform resource locator of each application in the list of applications.

Upon receipt of the above details from the cloud server, the CDAL of the client device A then determines a state and a version of one or more specific applications comprised in the client device. In an embodiment, the state may be a presence or an absence of the one or more specific applications. The specific applications are from the list of applications or applications comprised in the cloud server. The expression 'version' as known in the art refers to a specific form of something differing in certain respects from an earlier form or other forms of the same type of thing. Based on the determined state and version of the one or more specific applications, the CDAL of the client device A performs at least one of (i) registering, in the database 108 of the client device 100, (a) the determined version of the one or more specific applications is an outdated version and (b) the one or more specific applications are required for an upgrade; (ii) registering, in the database 108 of the client device 100, the one or more specific applications are (a) not configured in the client device and (b) required for download and installation therein; and (iii) uninstalling the one or more specific applications from the client device and removing an associated entry from the database 108.

For instance, say the client device A has applications App 1, App 2, App 3, App 4 and so on, and their corresponding versions are 1.5, 2.3, 4.0, 5.4 and so on. Let, details of the list of applications as received from the cloud server include information as follows: App 1—current version 1.8, App 2—current version 2.3, App 3—not present in the cloud database, App 4—current version 5.3, App 5—current version 1.3. According to the above details, the CDAL automatically (i) registers, in the database 108 of the client device A, that (a) the App 1 and App 4 are outdated versions and (b) an entry is made in the database 108 that both the App 1 and App4 require an upgrade, wherein upgradation can happen as applicable, (ii) registers in the database that there is no change required for App 2, (iii) performs (a) uninstallation of the App 3 as the same is not present in the cloud server or sets in a queue for an uninstallation task to be performed and (iv) registers an entry for App 5 in the database 108 and initiates a request for installation of App 5. In an embodiment, the above operations, installation/upgradation, uninstallation, and the like may either be performed in a sequential manner or may be performed in parallel.

The CDAL installs specific applications in the client device 100 based on an availability and registers a status of each of the one or more specific applications in the database 108. For instance, the status is one of an installation successful or an installation unsuccessful for the applications that are either required to be installed or were required for an upgradation. By performing above operations, the CDAL ensures that a uniform UI is provided and thereby a device management is enabled for controlling from the cloud server depending upon the current state and status of each application installed in the client device A. The above steps including querying the cloud server by the CDAL of the client device A, requesting details from the cloud server, performing installation, uninstallation, and/or upgradation are carried out automatically by the CDAL itself, in one example embodiment. The above steps may be carried out by the cloud server on the client device A, in another example embodiment. The above steps may be carried out on the client device A via one or more inputs (from a user/actor, entity such as organization, institute), in yet another example embodiment. In other words, the entire interaction of the client device with the cloud server/cloud database may be either automatically carried out by the client device itself (via the CDAL of the client device) or may be carried out via one or more inputs from entity (e.g., user, organization, institute to which it is tagged).

Once the client device A is up-to-date with all the necessary configuration and the applications installed therein, the client device A can serve as a master device, wherein the master device can automatically upgrade and synchronize remaining client devices tagged to that entity (e.g., the company ABC or the educational institute XYZ) via the CDAL comprised therein. In this regard, FIG. 2B, with reference to FIGS. 1-2A, depicts an exemplary flow chart illustrating a method for upgrading and synchronizing applications in a plurality of client devices, by a master device in accordance with an embodiment of the present disclosure. More specifically, FIG. 2B depicts an exemplary flow chart illustrating a method for upgrading and synchronizing applications in a plurality of client devices, by at least one client device serving as a master device in accordance with an embodiment of the present disclosure. For instance, the client device A serving as the master device, is configured to upgrade and synchronize remaining client devices B-N. In an embodiment, the each of the remaining client devices (e.g., say client devices B-N) comprises one or more data storage devices or the memory 102 operatively coupled to the one or more hardware processors and are configured to store instructions for execution of steps of the method by the one or more processors 104. More specifically, the client devices B-N and the client device A are identical in nature, in one embodiment.

The steps of the method of the present disclosure will now be explained with reference to components of the system 100 of FIG. 1, FIG. 2A, the flow diagram as depicted in FIG. 2B and FIG. 3. In an embodiment, at step 202 of the present disclosure, the CDAL of the client device serving as the master device creates, in an offline mode, an ad hoc network at a given time of instance. The expression 'ad hoc network' refers to a private secured network (e.g., a Wi-Fi network) that is created by the CDAL of the client device A by automatically exchanging encrypted credentials with other remaining client devices B-N (or with corresponding CDALs of the remaining client devices B-N). Each of the remaining client devices B-N also comprise a corresponding CDAL. Such ad hoc network creation can be performed by a network creation algorithm as known in the art. At step 204 of the present disclosure, the CDAL establishes a communication session between the master device and the plurality of client devices B-N using the created ad hoc network. It is to be understood by a person having ordinary skill in the art or person skilled in the art that the master device A and the remaining client device B-N are tagged to the same entity (e.g., in this case say the company ABC).

At step 206 of the present disclosure, the CDAL of the master device A upgrades a version of one or more applications comprised in the plurality of client devices B-N to a corresponding version of one or more corresponding applications comprised in the master device. In an embodiment of the present disclosure, if any of the client device has previously connected with the cloud server and has the same set of applications with latest updates/versions, such devices may be prevented from upgradation and further synchronization. The CDAL of the master device may identify that such devices may not require any upgradation and/or synchronization once the communication session is established. For instance, say client device A serving as the master device establishes communication session with other client devices B-N, during which the master device may learn that some of the client devices are up to date (e.g., say client device E and client device G) and the client device E and client device G are not required to be upgraded. Connecting to the ad hoc network of the master device by the client devices B-N may be performed with or without any user inputs. For instance, once the ad hoc network is detected by the client devices B-N, the client devices B-N may automatically connect to the ad hoc network. Alternatively, user input such as selection of the ad hoc network being detected can be carried out such that the client devices B-N process the user input and the client devices B-N connect to the ad hoc network accordingly. In an embodiment, there could be a scenario where there are some client devices which require only specific applications upgradation. For instance, client device B may require App 1 and App 5 upgradation and may have the latest versions of App 2, App 3, App 4, etc. In such scenarios, the CDAL of the master device may upgrade the client device B with only App 1 and App 5. In another scenario, client device C may require upgradation of all applications installed therein. The CDAL of the master device upgrades all applications of the client device C. Further, client device F may have App 1, App 2, App 3, App 4 and App 5 wherein App 1, App 2, App 4, and App 5 are latest versions. As App 3 is not present in the cloud server and was uninstalled from the master device A, the CDAL of the master device A in this case only initiates a process for uninstallation of App 3 from the client device F.

Once the above various operations are performed by the CDAL of the master device, at step 208 of the present disclosure, the CDAL of the master device synchronizes the master device and the plurality of client devices such that the same uniform user interface (UI) of the master device is enabled for the plurality of client devices B-N. In other words, color settings, one or more actions associated with one or more icons and associated configurations thereof of the one or more applications comprised in client devices B-N are identical to corresponding color settings, corresponding one or more actions associated with one or more corresponding icons and configurations associated thereof of one or more corresponding applications comprised in the master device (e.g., the client device A).

It is to be understood by a person having ordinary skill in the art or person skilled in the art that the steps 202 till 208 are carried out by the CDAL of the master device in an offline mode via the created ad hoc network. In an embodiment, the steps 202 till 208 are automatically carried out by the CDAL itself, in one example embodiment. The steps 202 till 208 are carried out by the CDAL based on a trigger from the cloud server, in another example embodiment. The steps 202 till 208 may be carried out via one or more inputs (from a user), in yet another example embodiment. The steps 202 till 208 are depicted in FIG. 3. FIG. 3, with reference to FIGS. 1 through 2B, depicts a block diagram of an overall architecture for execution and controlling of applications installed therein, by the cloud server, in accordance with an embodiment of the present disclosure. Particularly, FIG. 3 depicts a block diagram of an overall architecture for execution and controlling of applications installed in the plurality of client devices B-N, by the cloud server via the master device, in accordance with an embodiment of the present disclosure. In FIG. 3, the at least one client device A serving as the master device is referred as an invigilator device and the remaining client devices B-N are referred as candidate devices 1-*n*.

Further, each of the CDAL of the master device and the plurality of corresponding CDALs of the plurality of client devices comprises a UI based power element (also referred as a soft power element). In other words, the CDAL has a power button. When (i) an application is running or a task is being performed on at least one application being executed in the master device and/or the plurality of client devices, and (ii) an action is detected on the power button (e.g., say a user presses the power button when the device is ON and some application is running), then corresponding CDAL of the master device and/or the client devices prevent a change from a first state to a second state in the master device and/or the plurality of client devices. In an embodiment, the first state is an active ON state, and the second state is selected from the group of modes consisting of a sleep mode, a hibernation mode, and a shutdown mode. For better understanding of the above embodiment, below is an example. Say, a task is being performed on at least one application (e.g., a word processing program/application) running on the master device and/or any client device. For instance, task herein may be text is being typed/processed in a Microsoft® Word application. During this task, if an input is received on the power button, then the CDAL of that device prevents the device from going into the sleep mode, the hibernation mode, or the shutdown mode from an active ON mode. It is to be understood by a person having ordinary skill in the art or person skilled in the art that though the present disclosure describes the capability and configuration of the UI based power element on the application launcher, such example shall not be construed as limiting the scope of the present disclosure and the same functionality/capability of the UI based power element on the application launcher may be extended to, or realized in an external power button (e.g., hardware power button) present on each of the master device and client devices.

The CDAL of the master device is further configured to dynamically (or programmatically) configure and assign a unique theme to each of the plurality of client devices depending upon a scenario. The CDAL of the master device determines content to be shared with one or more of the plurality of client devices and the unique theme is rendered on the one or more of the plurality of client devices according to the content shared. This content along with the theme information can be downloaded from the cloud server by the master device, and the master device when it connects to the other client devices transmits the content along with the associated theme information.

For instance, say, the client devices B-N are deployed in an educational institute (e.g., the educational institute XYZ), wherein the plurality of client devices B-N can serve as candidate assessment devices for one or more candidates to assess online question papers. The online question papers can be facilitated by the respective CDALs via an application program comprised in each of the client devices. Question papers can either be for a subject that is identical in all the client devices, in one example embodiment. The question papers may refer to multiple subjects and accordingly shared across the client devices B-N. Assuming that the question paper is of an objective type and the assessment is say science and math subjects. The CDAL of the master device may assign a color to each of the plurality of client devices B-N. When the assessment is taken by the one or more candidates using the plurality of client devices b-N, the unique theme is rendered on each of the plurality of client devices. Such rendering can occur depending upon configurations and display setup of the plurality of client devices. For instance, each of the plurality of client devices may be designed with a LED panel on any side (or all sides) of the devices. For instance, each of the plurality of client devices may be of square or rectangle shape and a LED panel may be placed on top of the upper surface of each of the plurality of client devices, wherein the LED panel may serve as a border, in one example embodiment. The LED panel is configured to glow with the unique theme (e.g., color) that is to be rendered on the client devices during an on-going assessment. For example, the LED panel serving as a border for a client device B may glow with red color for science question paper as the subject to be assessed, and the LED panel serving as a border for a client device C may glow with green color for math question paper as the subject to be assessed. This coloring theme of the question paper enables an invigilator (who may be equipped with the master device/invigilator device) to quickly distinguish between candidates that no same subject candidates are sitting next to each other thus avoiding cheating by the candidates.

Another scenario of theme rendering can be in client devices utilized in hospitals/medical facilities and the like. For instance, client devices operating in one department (e.g., radiology) may be configured to receive reports related to subject(s) (or episode between a patient and a medical professional) and a unique theme on such client devices can be rendered. More specifically, client devices operating in radiology department may be configured to receive reports related to scanning body parts of the subjects done and a unique theme (e.g., say a low volume continuous beep sound) on such client devices can be rendered/triggered. In case, the theme is a sound, the client devices are configured with required audio settings for rendering based on the content received (e.g., ultrasound scanned reports). Another example, client devices operating in another department (e.g., pathology) may be configured to receive reports related to viral infection (e.g., report may include blood, glucose, urine tests, and the like) and a unique theme (e.g., say a low volume beep sound at pre-defined time intervals via audio port such as a speaker) on such devices can be rendered. In case, the theme is a sound at regular intervals for a specific time period, the client devices are configured with required audio settings for rendering based on the content received (e.g., test reports). For instance, when the blood, glucose and urine test report is under scrutiny by a medical professional who is associated with the client device at that moment, the sound may be triggered at regular intervals (e.g., say every 5 seconds a beep sound until the medical professional is viewing the report). The sound or theme may be automatically stopped or aborted from beeping when the report is closed or when the medical professional completes viewing of the report. Theme rendering further ensures to check the content delivered is as per the requirement and is shared on a need to know basis. Though the example scenario describes for specific departments (e.g., radiology, pathology, and the like), it is to be understood by a person having ordinary skill in the art or person skilled in the art that the method of the present disclosure can be implemented within each of the department as well. For instance, let each client device be associated with a corresponding medical professional in a department (e.g., orthopedic). Within this department there could be consultants, surgeons and the like. Therefore, content can be customized by the master device (e.g., wherein the master device may be associated with a head of orthopedic department). In such scenarios, preliminary reports on prescription may go to consultant, advance reports such as episodes, scan report(s), surgical procedurals related information can be shared with only surgeons.

Yet further scenarios where the system and method of the present disclosure can be implemented are (i) obtaining survey feedbacks from users, (ii) in manufacturing industries, and the like. For instance, in manufacturing industries, say there are 'm' number of processes/equipment operating in a process plant and there are 'n' number of operators such as technicians, engineers, supervisors, and the like. Information pertaining to each process/equipment can be customized by the master device associated with the process plant and the content related to each process/equipment can be shared on a corresponding client device associated with each corresponding technician(s), engineer(s), and supervisor(s) respectively along with a unique theme.

It is to be understood by a person having ordinary skill in the art or person skilled in the art that the LED display panel/audio port(s) may not necessarily form a part of the client devices. Rendering theme information on each client device in such scenarios may be performed by other ways in any other form as deemed fit, based on the capability and configuration of each client device. Any client device that serves as the master device may be provided with various options on themes for selection, and such selection can be dynamic in nature. Further, such implementations ensure that data and services are customized and shared with relevant stakeholders on a need to know basis via a secured channel. Further, the content sharing is carried out in an encrypted form (e.g., using one or more encryption techniques as known in the art). The content shared by the master device to the client devices is then accessed by decrypting the content wherein the decryption is carried by using one or more decryption techniques as known in the art. Likewise, upgradation and synchronization are carried out based on the list of applications shared by the master device to be upgraded via an encrypted communication channel wherein the applications are encrypted using the one or more encryption techniques as known in the art. The applications are then decrypted at each of the client devices by using the one or more decryption techniques as known in the art and are then configured in respective client devices. The encryption technique is described in FIG. 3. Though FIG. 3 depicts implementation of encryption technique(s) by the present disclosure, it is to be understood by a person having ordinary skill in the art or person skilled in the art that the present disclosure and its systems and methods implement decryption technique for performing decryption of applications/content to be accessed at the client devices. The encryption techniques and the decryption techniques may be comprised in the master device/client devices and invoked/executed as applicable to perform the methodology described herein, in one example embodiment. The encryption techniques and the decryption techniques may be comprised in the cloud server and invoked/executed as applicable to perform the methodology described herein, in another example embodiment.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for execution and controlling applications in computing devices, comprising:
    creating, in an offline mode, an ad hoc network by a cloud driven application launcher (CDAL), the CDAL being configured on a client device serving as a master device at a given time of instance, wherein the step of creating, in the offline mode, the ad hoc network by the cloud driven application launcher, is preceded by:
        transmitting, by the CDAL of the client device, (i) information pertaining to an entity to which the client device is tagged and (ii) a device identifier of the client device to a cloud server, wherein the information and the device identifier are transmitted by the CDAL when a launch instance of the CDAL is determined as a first time launch instance;
        obtaining, by the CDAL of the client device, a configuration record version from the cloud server;
        performing, by the CDAL of the client device, a comparison of the obtained configuration record version and a configuration record version comprised in the client device:
        obtaining, by the CDAL of the client device, updated configuration records along with one or more configuration elements and a version of configuration check based on the comparison; and
        reconfiguring the CDAL and one or more associated attributes by (i) parsing the updated configuration records along with the one or more configuration elements and (ii) applying one or more associated changes to the CDAL of the client device;
    establishing, by the CDAL, a communication session between the master device and a plurality of client devices using the created ad hoc network, wherein the master device and the plurality of client devices are associated with the entity;
    upgrading in the offline mode, by the CDAL, a version of one or more applications comprised in the plurality of client devices to a corresponding version of one or more corresponding applications comprised in the master device; and
    synchronizing in the offline mode, via the ad hoc network, the master device and the plurality of client devices such that a uniform user interface (UI) is enabled for the master device and the plurality of client devices.

2. The processor implemented method as claimed in claim 1, wherein the step of creating, in the offline mode, the ad hoc network by the cloud driven application launcher, is preceded by:
    transmitting, by the client device, a request to the cloud server; and
    obtaining, from the cloud server, information pertaining to the entity to which the one client device is tagged to, based on the request, and wherein the information pertaining to the entity is stored in a database of the client device.

3. The processor implemented method as claimed in claim 2, wherein when the cloud server fails to recognize the client device, the cloud server aborts communication with, and transmission of subsequent information to, the client device.

4. The processor implemented method as claimed in claim 1, further comprising one or more of:
  upon reconfiguring the CDAL, creating, by the CDAL of the client device, one or more icons for one or more applications configured in the client device;
  transmitting, by the CDAL, the device identifier of the client device; and
  obtaining, from the cloud server, details comprising (i) a list of applications configured for the entity, (ii) a version of each application in the list of applications, and (iii) a uniform resource locator of each application in the list of applications.

5. The processor implemented method as claimed in claim 4, further comprising:
  determining based on the list of applications, by the CDAL of the client device, a state and a version of one or more specific applications comprised in the client device, wherein the state comprises a presence or an absence of the one or more specific applications, and wherein the one or more specific applications are from the list of applications; and
  based on the determined state and the determined version of the one or more specific applications comprised in the client device, performing, by the CDAL, one of:
  (i) registering, in a database of the client device, (a) the determined version of the one or more specific applications is an outdated version and (b) the one or more specific applications are required for an upgrade;
  (ii) registering, in the database of the client device, the one or more specific applications are (a) not configured in the client device and (b) required for download and installation therein; and
  (iii) uninstalling the one or more specific applications from the client device and removing an associated entry from the database,
  wherein based on the determined state, the CDAL is configured to (i) install the one or more specific applications in the master device based on an availability and (ii) register a status of each of the one or more specific applications in the database,
  wherein the status is one of an installation successful or an installation unsuccessful, and wherein the CDAL is configured to (i) provide the uniform UI and (ii) enable a device management from the cloud server based on the determined state and the status.

6. The processor implemented method as claimed in claim 1, further comprising:
  preventing a change from a first state to a second state in one or more of the master device and the plurality of client devices, upon receipt of an input on the UI based power element comprised on (i) the CDAL of the master device and (ii) a corresponding CDAL of the plurality of client devices, during an execution of at least one application comprised therein, wherein the first state is an active ON state, and
  wherein the second state is selected from the group of modes consisting of a sleep mode, a hibernation mode, and a shutdown mode.

7. The processor implemented method as claimed in claim 1, further comprising dynamically determining and assigning, by the CDAL of the master device, a unique theme to each of the plurality of client devices;
determining, by the CDAL associated with the master device, content to be shared with one or more of the plurality of client devices; and
rendering based on the determined content, by the CDAL, the unique theme on the one or more of the plurality of client devices.

8. A client device for execution and controlling applications in computing devices, comprising:
  a memory storing instructions, a database and a cloud driven application launcher (CDAL);
  one or more communication interfaces; and
  one or more hardware processors coupled to the memory via the one or more communication interfaces, wherein the one or more hardware processors are configured by the instructions to execute the CDAL, the CDAL, upon execution is configured to:
  create, in an offline mode, an ad hoc network by a cloud driven application launcher (CDAL), the CDAL being configured on the client device serving as a master device at a given time of instance, wherein prior to creating the ad hoc network, the CDAL of the client device:
    transmits (i) information pertaining to an entity to which the client device is tagged to and (ii) a device identifier of the client device to a cloud server, wherein the information and the device identifier are transmitted by the CDAL when a launch instance of the CDAL is determined as a first time launch instance;
    obtains a configuration record version from the cloud server;
    performs a comparison of the obtained configuration record version and a configuration record version comprised in the client device;
    obtains updated configuration records along with one or more configuration elements and a version of configuration check based on the comparison; and
    reconfigures the CDAL and one or more associated attributes by (i) parsing the updated configuration records along with the one or more configuration elements and (ii) applying one or more associated changes to the CDAL of the client device, wherein upon reconfiguring the CDAL, the CDAL creates one or more icons for one or more applications configured in the client device;
  establish a communication session between the master device and a plurality of client devices using the created ad hoc network, wherein the master device and the plurality of client devices are associated with the entity;
  upgrade in the offline mode, by the CDAL, a version of one or more applications comprised in the plurality of client devices to a corresponding version of one or more corresponding applications comprised in the master device; and
  synchronize in the offline mode, via the ad hoc network, the master device and the plurality of client devices such that a uniform user interface (UI) is enabled for the master device and the plurality of client devices.

9. The client device of claim 8, wherein the CDAL of the client device is configured to:
  transmit a request to the cloud server; and
  obtain, from the cloud server, information pertaining to the entity to which the one client device is tagged to, based on the request, wherein the information pertaining to the entity is stored in a database of the client device, and wherein when the cloud server fails to recognize the client device, the cloud server aborts communication with, and transmission of subsequent information to, the client device.

10. The client device as claimed in claim 8, wherein the CDAL of the client device is further configured to:
transmit the device identifier of the client device;
obtain, from the cloud server, details comprising (i) a list of applications configured for the entity, (ii) a version of each application in the list of applications, and (iii) a uniform resource locator of each application in the list of applications;
determine based the list of applications, by the CDAL of the client device, a state and a version of one or more specific applications comprised in the client device, wherein the state comprises a presence or an absence of the one or more specific applications, and wherein the one or more specific applications are from the list of applications; and
perform one of the following based on the determined state and the determined version of the one or more specific applications comprised in the client device:
(i) registering, in a database of the client device, (a) the determined version of the one or more specific applications is an outdated version and (b) the one or more specific applications are required for an upgrade;
(ii) registering, in the database of the client device, the one or more specific applications are (a) not configured in the client device and (b) required for download and installation therein; and
(iii) uninstalling the one or more specific applications from the client device and removing an associated entry from the database,
wherein based on the determined state, the CDAL is configured to (i) install the one or more specific applications in the master device based on an availability and (ii) register a status of each of the one or more specific applications in the database, and
wherein the status is one of an installation successful or an installation unsuccessful, and wherein the CDAL is configured to (i) provide the uniform UI and (ii) enable a device management from the cloud server based on the determined state and the status.

11. The client device as claimed in claim 8, wherein each of the CDAL of the master device and the plurality of corresponding CDALs of the plurality of client devices comprises a UI based power element, wherein each of the CDAL of the master device and the plurality of corresponding CDALs of the plurality of client devices are configured to prevent a change from a first state to a second state in one or more of the master device and the plurality of client devices, upon receipt of an input on the UI based power element, during an execution of at least one application comprised therein, wherein the first state is an active ON state, and wherein the second state is selected from the group of modes consisting of a sleep mode, a hibernation mode, and a shutdown mode.

12. The client device as claimed in claim 8, wherein the CDAL of the master device is further configured to:
dynamically determine and assign a unique theme to each of the plurality of client devices;
determine content to be shared with one or more of the plurality of client devices; and
render based on the determined content, by the CDAL, the unique theme on the one or more of the plurality of client devices.

13. A computer program product comprising a non-transitory computer readable medium having a computer readable program embodied therein, wherein the computer readable program, when executed on a computing device serving as a master device, causes the computing device to execute a cloud driven application launch comprised in the computing device, for controlling applications in other computing devices serving as client devices, by:
creating, in an offline mode, an ad hoc network, by the cloud driven application launcher (CDAL), the CDAL being configured on a client device serving as the master device at a given time of instance, wherein the step of creating, in the offline mode, the ad hoc network by the cloud driven application launcher, is preceded by:
transmitting, by the CDAL of the client device, (i) information pertaining to an entity to which the client device is tagged and (ii) a device identifier of the client device to a cloud server, wherein the information and the device identifier are transmitted by the CDAL when a launch instance of the CDAL is determined as a first time launch instance;
obtaining, by the CDAL of the client device, a configuration record version from the cloud server;
performing, by the CDAL of the client device, a comparison of the obtained configuration record version and a configuration record version comprised in the client device;
obtaining, by the CDAL of the client device, updated configuration records along with one or more configuration elements and a version of configuration check based on the comparison; and
reconfiguring the CDAL and one or more associated attributes by (i) parsing the updated configuration records along with the one or more configuration elements and (ii) applying one or more associated changes to the CDAL of the client device;
establishing, by the CDAL, a communication session between the master device and a plurality of client devices using the created ad hoc network, wherein the master device and the plurality of client devices are associated with the entity;
upgrading in the offline mode, by the CDAL, a version of one or more applications comprised in the plurality of client devices to a corresponding version of one or more corresponding applications comprised in the master device; and
synchronizing in the offline mode, via the ad hoc network, the master device and the plurality of client devices such that a uniform user interface (UI) is enabled for the master device and the plurality of client devices.

14. The computer program product comprising a non-transitory computer readable medium of claim 13, wherein the step of creating, in the offline mode, the ad hoc network by the cloud driven application launcher, is preceded by:
transmitting, by the client device, a request to the cloud server; and
obtaining, from the cloud server, information pertaining to the entity to which the one client device is tagged to, based on the request, wherein the information pertaining to the entity is stored in a database of the client device, and wherein when the cloud server fails to recognize the client device, the cloud server aborts communication with, and transmission of subsequent information to, the client device.

15. The computer program product comprising a non-transitory computer readable medium of claim 13, wherein the computer readable program, when executed on the computing device serving as the master device, further causes one or more of:
   upon reconfiguring the CDAL, creating, by the CDAL of the client device, one or more icons for one or more applications configured in the client device;
   transmitting, by the CDAL, the device identifier of the client device; and
   obtaining, from the cloud server, details comprising (i) a list of applications configured for the entity, (ii) a version of each application in the list of applications, and (iii) a uniform resource locator of each application in the list of applications.

16. The computer program product comprising a non-transitory computer readable medium of claim 15, wherein the computer readable program, when executed on the computing device serving as the master device, further causes:
   determining based on the list of applications, by the CDAL of the client device, a state and a version of one or more specific applications comprised in the client device, wherein the state comprises a presence or an absence of the one or more specific applications, and wherein the one or more specific applications are from the list of applications; and
   based on the determined state and the determined version of the one or more specific applications comprised in the client device, performing, by the CDAL, one of:
   (i) registering, in a database of the client device, (a) the determined version of the one or more specific applications is an outdated version and (b) the one or more specific applications are required for an upgrade;
   (ii) registering, in the database of the client device, the one or more specific applications are (a) not configured in the client device and (b) required for download and installation therein; and
   (iii) uninstalling the one or more specific applications from the client device and removing an associated entry from the database,
   wherein based on the determined state, the CDAL is configured to (i) install the one or more specific applications in the master device based on an availability and (ii) register a status of each of the one or more specific applications in the database,
   wherein the status is one of an installation successful or an installation unsuccessful, and
   wherein the CDAL is configured to (i) provide the uniform UI and (ii) enable a device management from the cloud server based on the determined state and the status.

17. The computer program product comprising a non-transitory computer readable medium of claim 13, wherein the computer readable program, when executed on the computing device serving as the master device, further causes:
   preventing a change from a first state to a second state in one or more of the master device and the plurality of client devices, upon receipt of an input on the UT based power element comprised on (i) the CDAL of the master device and (ii) a corresponding CDAL of the plurality of client devices, during an execution of at least one application comprised therein,
   wherein the first state is an active ON state, and
   wherein the second state is selected from the group of modes consisting of a sleep mode, a hibernation mode, and a shutdown mode.

18. The computer program product comprising a non-transitory computer readable medium of claim 13, wherein the computer readable program, when executed on the computing device serving as the master device, further causes:
   dynamically determining and assigning, by the CDAL of the master device, a unique theme to each of the plurality of client devices;
   determining, by the CDAL associated with the master device, content to be shared with one or more of the plurality of client devices; and
   rendering based on the determined content, by the CDAL, the unique theme on the one or more of the plurality of client devices.

* * * * *